US009721525B2

(12) United States Patent
Park et al.

(10) Patent No.: US 9,721,525 B2
(45) Date of Patent: Aug. 1, 2017

(54) DISPLAY APPARATUS HAVING A DATA DRIVER OPERATED IN A POWER CUT-OFF MODE OR A STAND-BY MODE

(71) Applicant: Samsung Display Co., Ltd., Yongin, Gyeonggi-Do (KR)

(72) Inventors: Suhyeong Park, Gyeongju-si (KR); KyoungWon Lee, Seoul (KR); Hoyong Jung, Seongnam-si (KR); Sangmi Kim, Yongin-si (KR); Jimyoung Seo, Hwaseong-si (KR); Hyundae Lee, Hwaseong-si (KR); Heesoon Jeong, Hwaseong-si (KR); Cheolwoo Park, Suwon-si (KR); Bonghyun You, Yongin-si (KR)

(73) Assignee: Samsung Display Co., Ltd. (KR)

( * ) Notice: Subject to any disclaimer, the term of this patent is extended or adjusted under 35 U.S.C. 154(b) by 177 days.

(21) Appl. No.: 14/685,344

(22) Filed: Apr. 13, 2015

(65) Prior Publication Data

US 2016/0035306 A1 Feb. 4, 2016

(30) Foreign Application Priority Data

Aug. 1, 2014 (KR) ........................ 10-2014-0099116

(51) Int. Cl.
*G06F 3/038* (2013.01)
*G09G 3/36* (2006.01)

(52) U.S. Cl.
CPC ......... *G09G 3/3696* (2013.01); *G09G 3/3648* (2013.01); *G09G 2320/103* (2013.01);
(Continued)

(58) Field of Classification Search
CPC ............... G09G 3/3696; G09G 3/3648; G09G 2340/0435; G09G 2330/021; G09G 2320/103
See application file for complete search history.

(56) References Cited

U.S. PATENT DOCUMENTS 9,236,025 B2 * 1/2016 Ahn ......................... G09G 5/02
2009/0027373 A1 * 1/2009 Chiang .................... G09G 3/20
345/212
(Continued)

FOREIGN PATENT DOCUMENTS

KR 100594464 B1 6/2006
KR 1020130027226 A 3/2013
(Continued)

*Primary Examiner* — Rodney Amadiz
(74) *Attorney, Agent, or Firm* — Innovation Counsel LLP

(57) ABSTRACT

A display apparatus includes a display panel configured to display an image, a data driver including a voltage generator configured to convert an image data applied thereto to a data voltage and a buffer configured to apply the data voltage to the display panel, a timing controller including a mode controller configured to generate a mode selection signal on the basis of an image frame rate of the image data. The data driver is configured to be operated in a power cut-off mode or a stand-by mode in response to the mode selection signal. The driving voltage switch is configured to cut off the analog driving voltage applied to at least one of the buffer and the voltage generator during the power cut-off mode and the bias controller is configured to reduce a bias current in the stand-by mode.

19 Claims, 11 Drawing Sheets

(52) U.S. Cl.
CPC ................. *G09G 2330/021* (2013.01); *G09G 2340/0435* (2013.01)

(56) References Cited

U.S. PATENT DOCUMENTS

| | | | | |
|---|---|---|---|---|
| 2009/0096777 | A1* | 4/2009 | Miyabe | G09G 3/2092 345/213 |
| 2011/0199404 | A1 | 8/2011 | Umezaki et al. | |
| 2013/0215094 | A1 | 8/2013 | Choi et al. | |
| 2013/0293451 | A1 | 11/2013 | Yeh et al. | |
| 2013/0293600 | A1* | 11/2013 | Lee | G09G 3/3258 345/691 |
| 2014/0204064 | A1* | 7/2014 | Chen | G09G 5/18 345/204 |

FOREIGN PATENT DOCUMENTS

| | | | |
|---|---|---|---|
| KR | 1020130028612 | A | 3/2013 |
| KR | 1020130077052 | A | 7/2013 |
| KR | 1020130113821 | A | 10/2013 |
| KR | 1020140076252 | A | 6/2014 |
| KR | 1020150094881 | | 8/2015 |
| KR | 1020150100978 | | 9/2015 |

* cited by examiner

DISPLAY APPARATUS HAVING A DATA DRIVER OPERATED IN A POWER CUT-OFF MODE OR A STAND-BY MODE

CROSS-REFERENCE TO RELATED APPLICATION

This U.S. non-provisional patent application claims priority under 35 U.S.C. §119 of Korean Patent Application No. 10-2014-0099116, filed on Aug. 1, 2014, the contents of which are hereby incorporated by reference in its entirety.

BACKGROUND

1. Field of Disclosure

The present disclosure relates to a display apparatus. More particularly, the present disclosure relates to a display apparatus having reduced power consumption.

2. Description of the Related Art

In general, a display apparatus includes pixel electrodes, switching devices respectively connected to the pixel electrodes, gate lines respectively connected to the pixel electrodes, and data lines respectively connected to the pixel electrodes.

To drive the display apparatus, various voltages or source powers are required. The display apparatus includes an AC/DC converter to convert an alternating-current source power to a direct-current source power and an analog circuit to convert the direct-current source power to an analog driving voltage. Accordingly, the display apparatus generates various voltages. The analog driving voltage is generated by controlling a reference source power to a predetermined level using a source power regulator and boosting the reference source power using a booster circuit, e.g., an electric charge pump.

The analog driving voltage is applied to a data driver, the data driver generates a data voltage using the analog driving voltage, and the data voltage is applied to the data lines. The power consumption significantly increases when the data driver outputs the data voltage.

SUMMARY

The present disclosure provides a display apparatus having reduced power consumption Embodiments provide a display apparatus including a display panel configured to display an image, a data driver that includes a voltage generator configured to convert an image data applied thereto to a data voltage, a buffer configured to apply the data voltage to the display panel, a driving voltage switch configured to switch an analog driving voltage input to the voltage generator and the buffer, a bias controller configured to control a bias current applied to the buffer, and a timing controller that includes a mode controller configured to generate a mode selection signal on the basis of an image frame rate of the image data. The data driver is configured to be operated in a power cut-off mode or a stand-by mode in response to the mode selection signal.

The driving voltage switch is configured to cut off the analog driving voltage applied to at least one of the buffer and the voltage generator during the power cut-off mode, and the bias controller is configured to reduce the bias current in the stand-by mode.

The data driver is configured to be operated in the power cut-off mode when the image frame rate is smaller than a first reference frame rate and the data driver is configured to be operated in the stand-by mode when the image frame rate is greater than the first reference frame rate.

The mode selection signal is configured to have a first selection level when the image frame rate is smaller than the first reference frame rate and to have a second selection level when the image frame rate is greater than the first reference frame rate, and the data driver is configured to be operated in the power cut-off mode in response to the mode selection signal having the first selection level and operated in the stand-by mode in response to the mode selection signal having the second selection level.

The mode controller includes a frequency comparison unit that is configured to receive the image frame rate and the first reference frame rate and compare the image frame rate and the first reference frame rate to generate the mode selection signal.

The timing controller further includes a memory unit configured to store a mode selection control value, the mode selection signal is configured to have the first selection level when the mode selection control value has a power cut-off mode value, and the mode selection signal is configured to have the second selection level when the mode selection control value has a stand-by mode value.

The timing controller is configured to receive a data enable signal that defines a blank period and an enable period, and the data driver is configured to operate in the power cut-off mode or the stand-by mode during the blank period and operate in a normal mode during the enable period.

The mode controller further includes a mode activation unit configured to generate a mode activation signal in the blank period, and the data driver is configured to be operated in the power cut-off mode or the stand-by mode during the blank period in response to the mode activation signal.

The mode activation signal is configured to have an activation level during the blank period and to have an inactivation level during the enable period, and the data driver is configured to be operated in the power cut-off mode or the stand-by mode in response to the activation level.

The timing controller further includes a memory unit configured to store a predetermined mode activation control value, and the mode activation signal is configured to have the inactivation level when the mode activation control value has a mode inactivation value.

The timing controller further includes a frame rate controller configured to receive an image information having an input frame rate, analyze the image information, and convert the image information to the image data having the image frame rate according to the analyzed result.

The frame rate controller is configured to generate an intermediate signal in the blank period and the mode activation unit is configured to generate the mode activation signal in response to the intermediate signal.

The frame rate controller is configured to generate a frame rate signal on the basis of the image frame rate and the frequency comparison unit is configured to extract the image frame rate from the frame rate signal.

The mode controller further includes a first mode activation unit that is configured to generate a first sub-activation signal, a second mode activation unit that is configured to generate a second sub-activation signal, and a selector that is configured to select one of the first and second sub-activation signals in response to a selection signal and output the selected signal to the bias controller and the driving voltage switch as a mode activation signal.

The selector is configured to select the first sub-activation signal when the image frame rate is greater than a second reference frame rate and select the second sub-activation signal when the image frame rate is smaller than the second reference frame rate.

The second reference frame rate is substantially the same as the first reference frame rate.

The display apparatus further includes a frame rate controller configured to receive an image information having an input frame rate, analyze the image information, and convert the image information to the image data having the image frame rate according to the analyzed result.

The second reference frame rate is substantially the same as the input frame rate.

The frame rate controller is configured to generate an intermediate signal and generate a frame rate signal on the basis of the image frame rate during the blank period, the first mode activation unit is configured to generate the first sub-activation signal in response to the intermediate signal, and the second mode activation unit is configured to generate the second sub-activation signal on the basis of the intermediate signal and the frame rate signal.

The mode controller further includes a first mode activation unit configured to generate a first sub-activation signal, a second mode activation unit configured to generate a second sub-activation signal, and a selector configured to select one of the first and second sub-activation signals in response to a selection signal and output the selected signal to the bias controller and the driving voltage switch as a mode activation signal.

The selection signal is the second sub-activation signal.

According to the above, the display apparatus includes the data driver selectively operated in the stand-by mode or the power cut-off mode in response to the frame rate of the image data. Thus, the power consumption in the data driver may be reduced.

BRIEF DESCRIPTION OF THE DRAWINGS

The above and other features of the present disclosure will become readily apparent by reference to the following detailed description when considered in conjunction with the accompanying drawings wherein.

DETAILED DESCRIPTION

Figure 1:
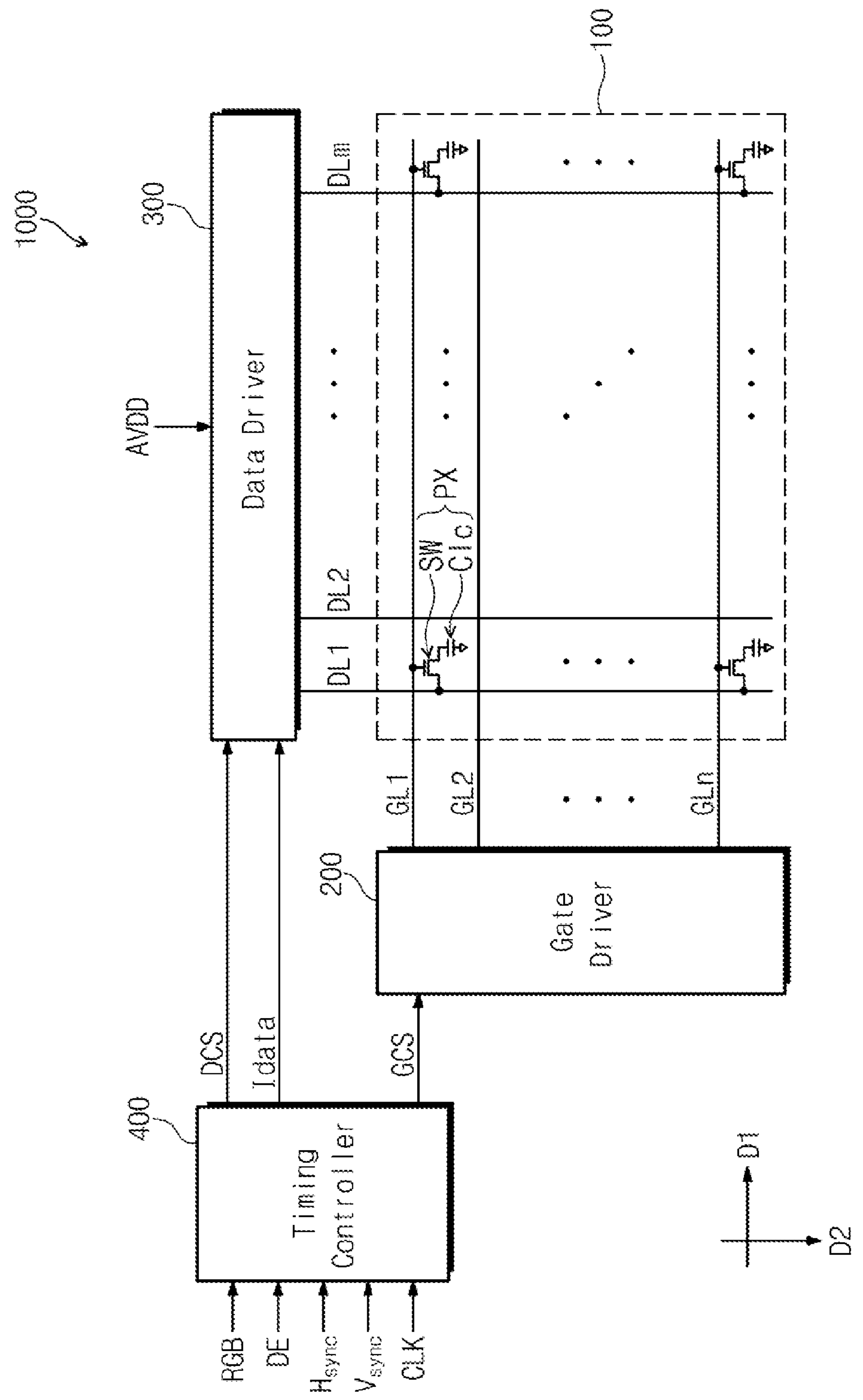
FIG. 1 is a block diagram showing a display apparatus according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second. etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the inventive concept. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this application belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments will be explained in detail with reference to the accompanying drawings.

Figure 2:
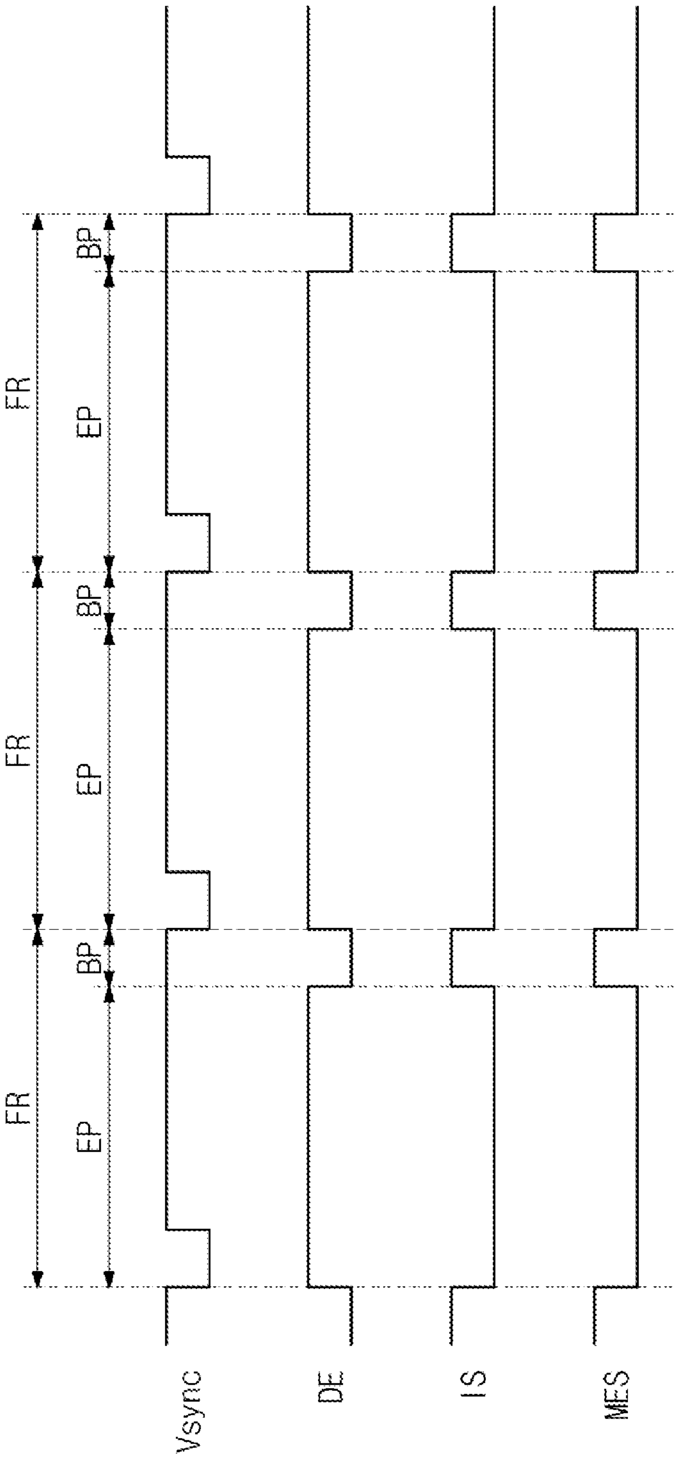
FIG. 2 is a timing diagram of signals shown in FIG. 1.

FIG. 1 is a block diagram showing a display apparatus 1000 according to an exemplary embodiment of the present disclosure and FIG. 2 is a timing diagram of signals shown in FIG. 1.

Referring to FIG. 1, the display apparatus 1000 includes a display panel 100 to display an image, gate and data drivers 200 and 300 to drive the display panel 100, and a timing controller 400 to control a drive of the gate driver 200 and a drive of the data driver 300.

The timing controller 400 receives image information RGB and control signals from the outside of the display apparatus 1000, e.g., an image source (not shown). The control signals include a vertical synchronization signal Vsync, a horizontal synchronization signal Hsync, a clock signal CLK, and a data enable signal DE. The image information RGB may have an input frame rate. The input frame rate is about 60 Hz.

The timing controller 400 converts a data format of the image information RGB to a data format appropriate to an interface between the data driver 300 and the timing controller 400 to generate image data Idata and applies the image data Idata to the data driver 300. In addition, the timing controller 400 generates a data control signal DCS and a gate control signal GCS on the basis of the control signals. The data control signal DCS is applied to the data driver 300 and the gate control signal GCS is applied to the gate driver 200. The data control signal DCS includes the vertical synchronization signal Vsync, the horizontal synchronization signal Hsync, the clock signal CLK, and the data enable signal DE.

The gate driver 200 sequentially outputs gate signals in response to the gate control signal GCS provided from the timing controller 400.

The data driver 300 converts the image data Idata to data voltages in response to the data control signal DCS provided from the timing controller 400. The converted data voltages are applied to the display panel 100.

The display panel 100 includes a plurality of gate lines GL1 to GLn, a plurality of data lines DL1 to DLm, and a plurality of pixels PX.

The gate lines GL1 to GLn extend in a first direction D and are arranged substantially in parallel to each other along a second direction D2 substantially vertical to the first direction D1. The gate lines GL1 to GLn are connected to the gate driver 200 to receive the gate signals from the gate driver 200.

The data lines DL1 to DLm extend in the second direction D2 and are arranged substantially in parallel to each other along the first direction D1. The data lines DL1 to DLm are connected to the data driver 300 to receive the data voltages from the data driver 300.

Each pixel PX includes a switching device SW that outputs a data signal in response to the gate signal and a liquid crystal capacitor Clc that receives the data voltage. Each pixel PX is connected to a corresponding gate line of the gate lines GL1 to GLn and a corresponding data line of the data lines DL1 to DLm. In more detail, each pixel PX is turned on or turned off in response to a corresponding gate signal of the gate signals. The turned-on pixel PX displays a grayscale corresponding to the data voltage applied thereto.

The display panel 100 may be various display panels, such as a liquid crystal display panel, an organic light emitting display panel, an electrophoretic display panel, an electrowetting display panel, etc.

As shown in FIG. 2, the vertical synchronization signal Vsync defines a plurality of frame periods FR. The vertical synchronization signal Vsync is configured to include a high period and a low period in every period, and a length of the period of the vertical synchronization signal Vsync corresponds to a length of each frame period FR. The vertical synchronization signal Vsync has a high level during the high period and a low level during the low level.

The data enable signal DE defines a blank period BP and an enable period EP in each frame period FR. For instance, the data enable signal DE has the high level during the enable period EP and the low level during the blank period BP. The blank period BP starts at a time point at which the enable period EP is finished in each frame period FR and is finished at a time point at which the frame period FR is finished.

As shown in FIG. 1, the data driver 300 is connected to the data lines DL1 to DLm, converts an analog driving voltage AVDD from an external source (not shown) to the data voltages appropriate to the image data Idata, and applies the data voltages to the data lines DL1 to DLm.

The data driver 300 outputs the data voltages to the display panel 100 during the enable period EP on the basis of the data enable signal DE and the horizontal synchronization signal Hsync. When the data enable signal DE is at the high level, the data driver 300 is synchronized with the horizontal signal Hsync to output the data voltages.

Figure 3:
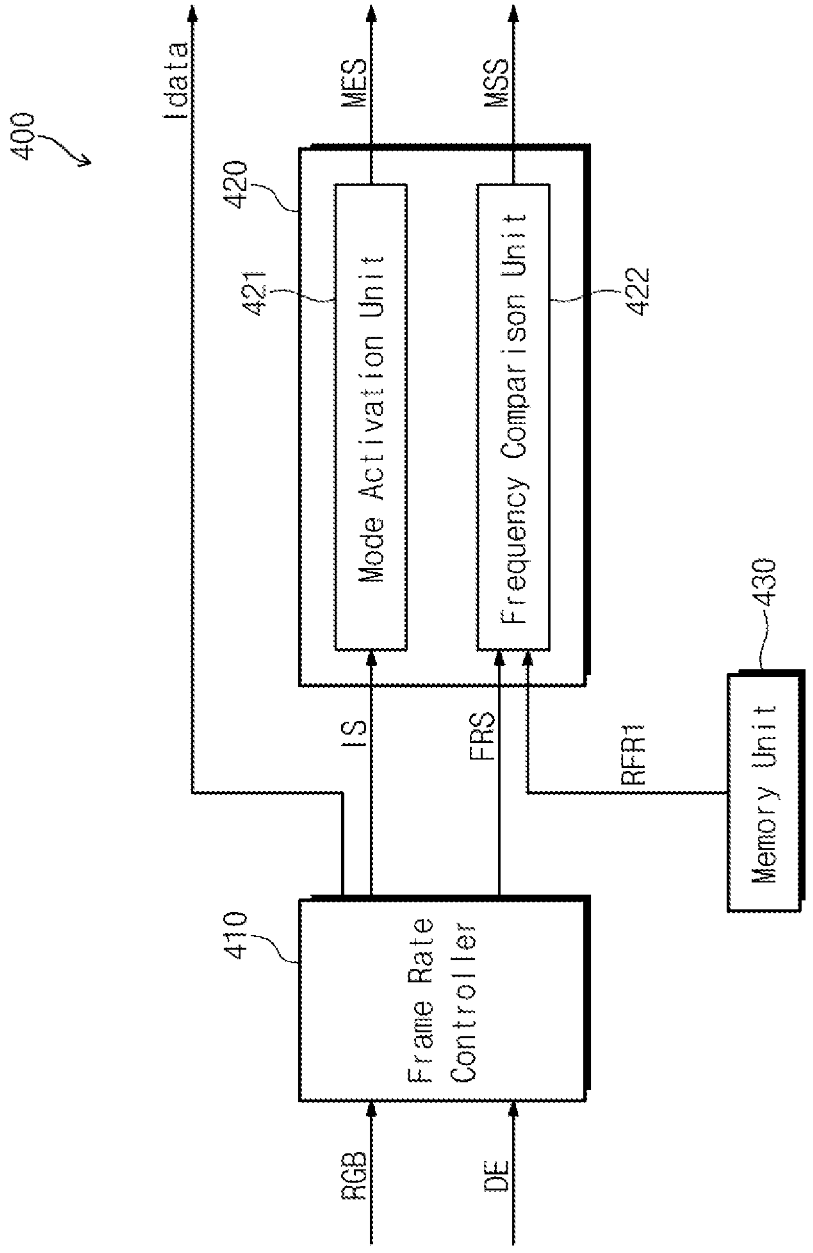
FIG. 3 is a block diagram showing a timing controller shown in FIG. 1.
Figure 4:
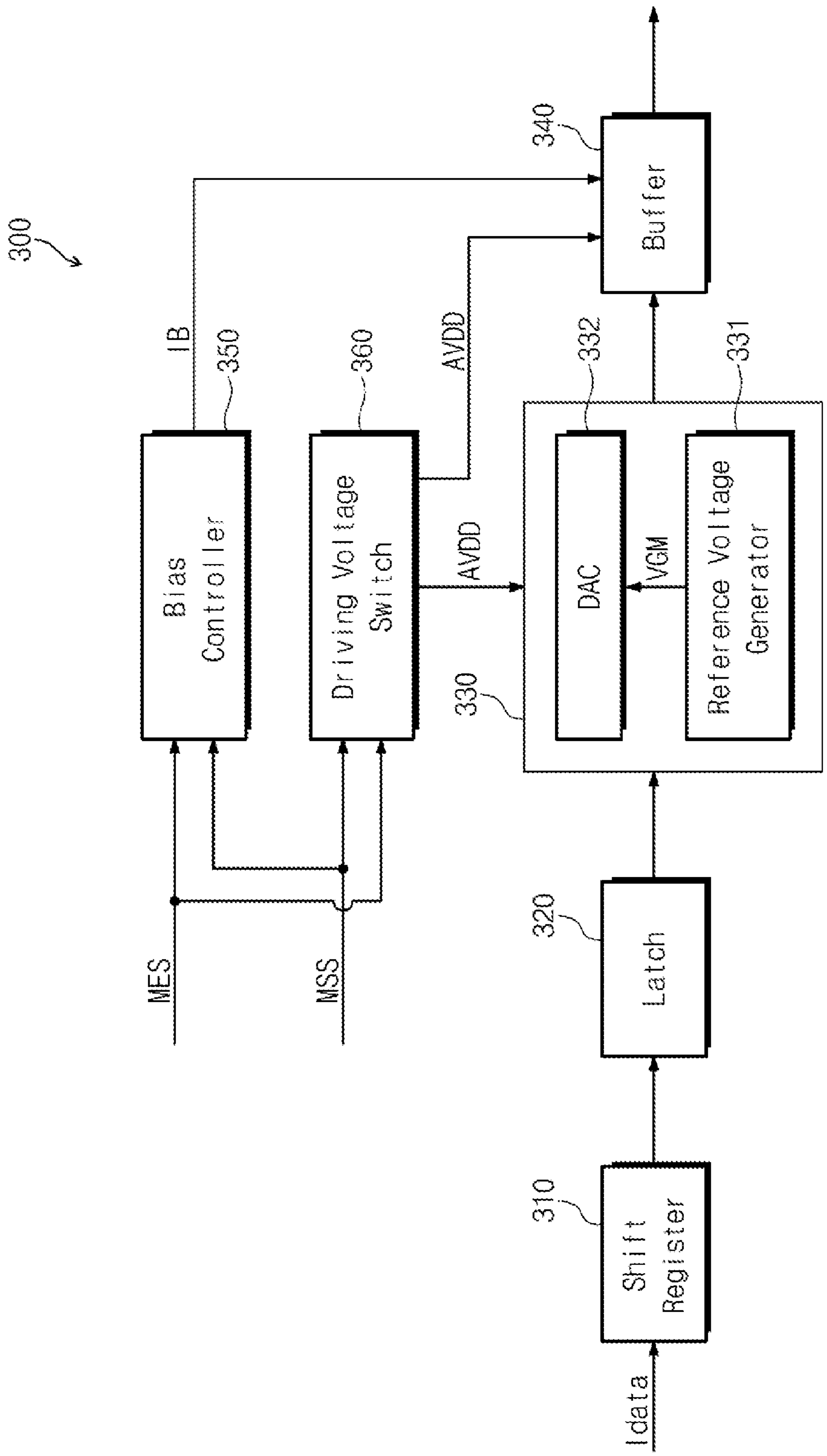
FIG. 4 is a block diagram showing a data driver shown in FIG. 1.
Figure 5:
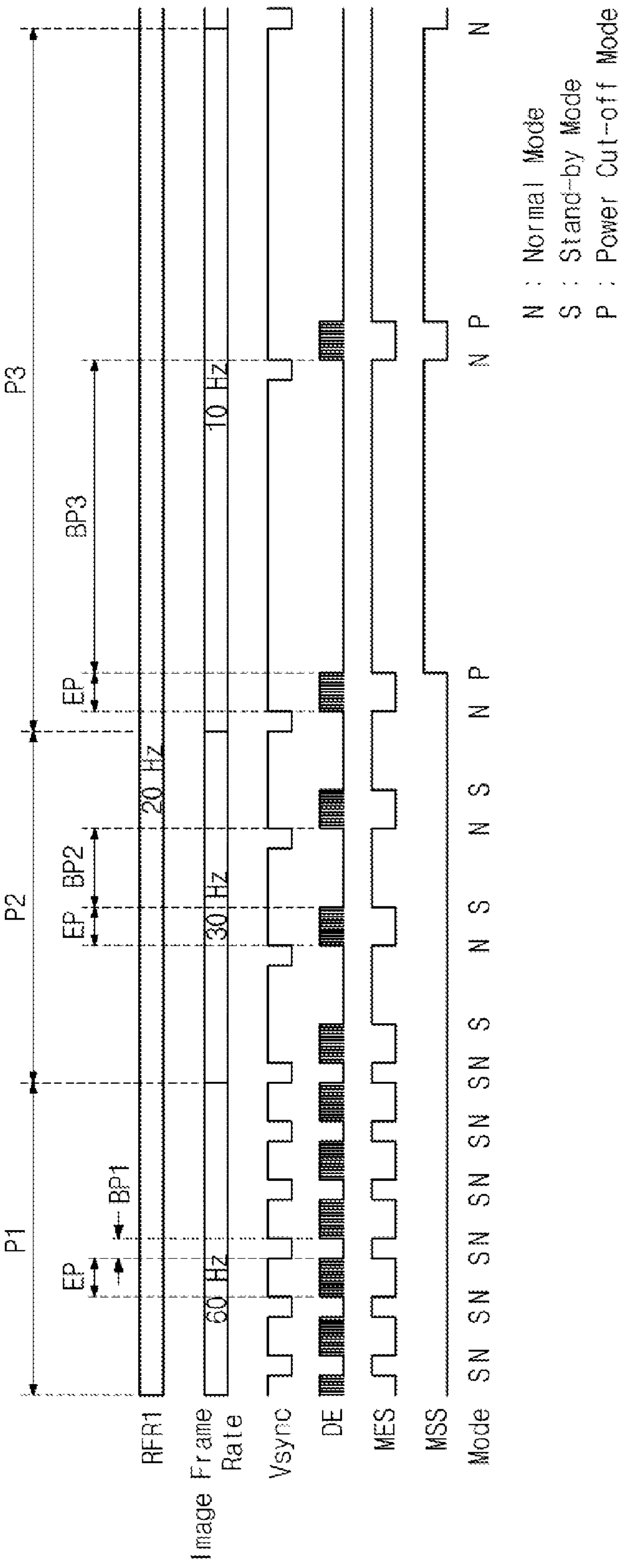
FIG. 5 is a timing diagram of signals shown in FIG. 3 according to an exemplary embodiment of the present disclosure.

FIG. 3 is a block diagram showing the timing controller 400 shown in FIG. 1, FIG. 4 is a block diagram showing the data driver 300 shown in FIG. 1, and FIG. 5 is a timing diagram of signals shown in FIG. 3 according to an exemplary embodiment.

Referring to FIG. 3, the timing controller 400 includes a frame rate controller 410, a mode controller 420, and a memory unit 430.

In the present exemplary embodiment, the frame rate controller 410 and the mode controller 420 serve as parts of the timing controller 400, but the frame rate controller 410 and the mode controller 420 may be mounted on a card or board separate from the timing controller 400. In this case, the frame rate controller 410 and the mode controller 420 are disposed between the image source and the timing controller 400 or in a unit connected between the image source and the timing controller 400.

The frame rate controller 410 receives the image information RGB, but it should not be limited thereto or thereby. That is, the frame rate controller 410 may receive data generated by processing the image information RGB using other elements of the timing controller 400.

The frame rate controller 410 analyzes the image information RGB and converts the image information RGB to the image data Idata having an image frame rate according to the analyzed result.

In more detail, the frame rate controller 410 analyzes the image information RGB to check whether the image is a motion image or a still image. When the image is the motion image, the frame rate controller 410 outputs the image information RGB as the image data Idata without changing a frame rate. In this case, the image frame rate is substantially the same as the input frame rate.

When the image is the still image, the frame rate controller 410 determines the image frame rate in accordance with the still image and converts the image information RGB to the image data Idata having the image frame rate. The image frame rate may be smaller than the input frame rate, and, for example, the image frame rate is about 30 Hz, about 20 Hz, or about 10 Hz.

When the image is the still image, the image data Idata is the same as the image data in a previous frame. Accordingly, the image data Idata is not required to be repeatedly processed by the timing controller 400 and the data driver 300. Therefore, the image frame rate may become lower than the input frame rate, and thus power consumption in the timing controller 400 and the data driver 300 may be reduced.

In addition, the frame rate controller 410 generates an intermediate signal IS in the blank period BP. As an example, the frame rate controller 410 receives the data enable signal DE and generates the intermediate signal IS on the basis of the data enable signal DE. The intermediate signal IS has a level in the enable period EP, which is different from a level in the blank period BP. For instance, the intermediate signal IS has the low level in the enable signal EP and the high level in the blank period BP as shown in FIG. 2.

Further, the frame rate controller 410 generates a frame rate signal FRS on the basis of the image frame rate.

The mode controller 420 generates a mode activation signal MES and a mode selection signal MSS and applies the mode activation signal MES and the mode selection signal MSS to the data driver 300. The data driver 300 is selectively operated in a power cut-off mode or a stand-by mode in response to the mode activation signal MES and the mode selection signal MSS. The power cut-off mode and the stand-by mode will be described in detail later.

The mode controller 420 includes a mode activation unit 421 and a frequency comparison unit 422.

The frequency comparison unit 422 generates the mode selection signal MSS on the basis of the image frame rate and a predetermined first reference frame rate RFR1.

In more detail, the frequency comparison unit 422 receives the frame rate signal FRS from the frame rate controller 410 and extracts the image frame rate from the frame rate signal FRS.

The first reference frame rate RFR1 is previously stored in the memory unit 430 and the frequency comparison unit 422 receives the first reference frame rate RFR1 from the memory unit 430. The first reference frame rate RFR1 may be smaller than the input frame rate. For instance, the first reference frame rate RFR1 is about 50 Hz, about 40 Hz, about 20 Hz, or about 10 Hz.

The frequency comparison unit 422 compares the first reference frame rate RFR and the image frame rate to generate the mode selection signal MSS. Accordingly, the mode selection signal MSS has a first selection level when the image frame rate is equal to or smaller than the first reference frame rate RFR1 and has a second selection level when the image frame rate is greater than the first reference frame rate RFR1. In the present exemplary embodiment, the first selection level may be the high level and the second selection level may be the low level.

The mode activation unit 421 generates the mode activation signal MES in the blank period BP. The mode activation unit 421 receives the intermediate signal IS from the frame rate controller 410 and generates the mode activation signal MES in response to the intermediate signal IS, but it should not be limited thereto or thereby. That is, in another embodiment, the mode activation unit 421 directly receives the data enable signal DE to generate the mode activation signal MES in response to the data enable signal DE.

The mode activation signal MES has a level in the enable period EP, which is different from a level in the blank period BP. For instance, the mode activation signal MES has an activation level in the blank period BP and an inactivation signal in the enable period EP, e.g., as illustrated in FIG. 2. In the present exemplary embodiment, the activation level is the high level and the inactivation signal is the low level.

Referring to FIG. 4, the data driver 300 includes a shift register 310, a latch 320, a voltage generator 330, and a buffer 340.

The shift register 310 includes a plurality of stages (not shown) connected to each other one after another. Each stage is applied with the clock signal CLK (refer to FIG. 1) and a first stage among the stages is applied with a horizontal start signal (not shown). When the first stage starts its operation in response to the horizontal start signal, the stages sequentially output a latch signal in response to the clock signal CLK. The horizontal start signal is provided from the timing controller 400.

The latch 320 receives the image data Idata from the timing controller 400 and latches the data corresponding to one line among the image data Idata in response to the latch signal sequentially provided from the stages. The latch 320 applies the latched data to the voltage generator 330.

The voltage generator 330 includes a reference voltage generator 331 and a digital-to-analog converter 332 (hereinafter, referred to as DAC) and converts the data to the data voltage.

The voltage generator 330 receives the analog driving voltage AVDD. The voltage generator 330 is operated using the analog driving voltage AVDD.

The reference voltage generator 331 receives the analog driving voltage AVDD and generates a plurality of gamma reference voltages VGM having different levels on the basis of the analog driving voltage AVDD.

The DAC 332 receives the gamma reference voltages VGM from the reference voltage generator 331 and converts the data to the data voltages on the basis of the gamma reference voltage VGM.

The buffer 340 is configured to include a plurality of operational amplifiers (not shown), receives the data voltages from the voltage generator 330, and outputs the data voltage to the display panel 100 (refer to FIG. 1) at the same time point in response to the output start signal. The buffer 340 receives the analog driving voltage AVDD and is operated using the analog driving voltage AVDD.

The data driver 300 may further include a bias controller 350 and a driving voltage switch 360. The bias controller 350 applies a bias current IB to the buffer 340 and controls the bias current IB. The driving voltage switch 360 switches the analog driving voltage AVDD applied to the voltage generator 330.

As an example, the data driver 300 receives the mode activation signal MES and the mode selection signal MSS, which are generated by the timing controller 400, and controls the bias controller 350 and the driving voltage switch 360 in response to the mode activation signal MES and the mode selection signal MMS, and thus the data driver 300 is selectively operated in the power cut-off mode or the stand-by mode. In addition, the data driver 300 may be in a normal mode when the data driver 300 is not operated in the power cut-off mode and the stand-by mode.

In the normal mode, the driving voltage switch 360 is in an ON state and applies the analog driving voltage AVDD to the buffer 340 and the voltage generator 330. In addition, during the normal mode, the bias controller 350 applies the bias current IB, which is enough to allow the buffer 340 to output the data voltages, to the buffer 340.

In the power cut-off mode, the driving voltage switch 360 may cut off the analog driving voltage AVDD input to at least one of the buffer 340 and the voltage generator 330. In the stand-by mode, the bias controller 350 may reduce the bias current IB input to the buffer 340. Therefore, the bias current IB in the stand-by mode is smaller than that in the normal mode.

The driving voltage switch 360 receives the mode selection signal MSS and the mode activation signal MES and cuts off the analog driving voltage AVDD in response to the mode selection signal MSS and the mode activation signal MES. As an example, the driving voltage switch 360 may cut off the analog driving voltage AVDD applied to the voltage generator 330 and the buffer 340.

The bias controller 350 receives the mode selection signal MSS and the mode activation signal MES and reduces the bias current IB applied to the buffer 340 in response to the mode selection signal MSS and the mode activation signal MES.

In more detail, when the mode selection signal MSS has the low level and the mode activation signal MES has the activation level, the bias controller 350 reduces the level of the bias current IB applied to the buffer 340.

Although not shown in figures, the data driver may further include a control block. The control block receives the mode activation signal MES and the mode selection signal MSS from the timing controller 400, converts the mode activation signal MES and the mode selection signal MSS by taking specifications of the bias controller 350 and the driving voltage switch 360 into consideration, and applies the converted mode activation signal MES and the converted mode selection signal MSS to the bias controller 350 and the driving voltage switch 360.

Hereinafter, the operation of the bias controller 350 and the driving voltage switch 360 will be described in detail with reference to FIG. 5.

In the present exemplary embodiment, the first reference frame rate RFR1 is set to about 20 Hz and the frame rate controller 410 converts the image information RGB to the image data Idata having different image frame rates in first, second, and third periods P1, P2, and P3. The image frame rates are respectively set to about 60 Hz, about 30 Hz, and about 10 Hz in the first, second, and third periods P1, P2, and P3.

The data enable signal DE and the vertical synchronization signal Vsync have a waveform corresponding to a period of the image frame rate. In detail, the data enable signal DE and the vertical synchronization signal Vsync have the high level and the low level, which are repeated with a period corresponding to the image frame rate of about 60 Hz, about 30 Hz, or about 10 Hz in the first to third periods P1 to P3.

The data enable signal DE defines the enable period EP in each of the first to third periods P1 to P3 and the blank periods BP1, BP2, and BP3 respectively in the first to third periods P1 to P3. The image frame rate becomes different in the first to third periods P1 to P3 and the enable period EP has a constant length regardless of the image frame rate. Thus, the blank periods BP1, BP2, and PB3 have different lengths from each other in the first to third periods P1 to P3, respectively.

In the first period P1, the image frame rate is set to about 60 Hz. Since the image frame rate is greater than the first reference frame rate RFR1 in the first period P1, the mode selection signal MSS has the second selection level during the first period P1. Accordingly, the data driver 300 is not operated in the power cut-off mode P during the first period P1 and operated in the normal mode N or the stand-by mode S in response to the mode activation signal MES during the first period P1.

In more detail, the mode activation signal MES has the activation level during the blank period BP1 of the first period P1. Accordingly, the data driver 300 is operated in the stand-by mode S during the blank period BP1 of the first period P1 and operated in the normal mode N during the enable period EP of the first period P1. That is, the bias controller 350 reduces the bias current IB applied to the buffer 340 during the blank period BP1 of the first period P1. Therefore, the power consumption in the buffer 340 may be reduced.

In the second period P2, the image frame rate is set to about 30 Hz. Since the image frame rate is greater than the first reference frame rate RFR1 in the second period P2, the mode selection signal MSS has the second selection level during the second period P2 similar to the first period P1. Accordingly, the data driver 300 is not operated in the power cut-off mode P during the second period P2 and operated in the normal mode N or the stand-by mode S in response to the mode activation signal MES during the second period P2.

In more detail, the mode activation signal MES has the activation level during the blank period BP2 of the second period P2. Therefore, the data driver 300 is operated in the stand-by mode S during the blank period BP2 of the second period P2 and operated in the normal mode N during the enable period EP of the second period P2. That is, the bias controller 350 reduces the bias current IB applied to the buffer 340 during the blank period BP2 of the second period P2.

In particular, since the length of the blank period BP2 of the second period P2 is longer than the blank period BP1 of the first period P1, a time duration in which the bias current IB is reduced in the second period P2 is longer than a time duration in which the bias current IB is reduced in the first period P1. Thus, the power consumption in the second period P2 may be much more reduced than that in the first period P1.

In the third period P3, the image frame rate is set to about 10 Hz. Since the image frame rate is smaller than the first reference frame rate RFR1 in the third period P3, the mode selection signal MSS has the first selection level during the third period P3. Accordingly, the data driver 300 is not operated in the stand-by mode S during the third period P3 and operated in the normal mode N or the power cut-off mode P in response to the mode activation signal MES during the third period P3.

In more detail, the mode activation signal MES has the activation level during the blank period BP3 of the third period P3. Therefore, the data driver 300 is operated in the power cut-off mode P during the blank period BP3 of the third period P3 and operated in the normal mode N during the enable period EP of the third period P3. That is, the driving voltage switch 360 cuts off the analog driving voltage AVDD applied to at least one of the buffer 340 and the voltage generator 330 during the blank period BP3 of the third period P3.

As described above, the data driver 300 is operated in the power cut-off mode P when the image frame rate is equal to or smaller than the first reference frame rate RFR1 and operated in the stand-by mode S when the image frame rate is greater than the first reference frame rate RFR1.

Since the analog driving voltage AVDD is cut off in the power cut-off mode P, the amount in reduction of the power consumption in the power cut-off mode P is greater than the amount in reduction of the power consumption in the stand-by mode S. However, a stabilization time is required to prevent a noise from being generated in the power cut-off mode P.

As described above, since the power cut-off mode P and the stand-by mode S are selectively activated on the basis of the first reference frame rate RFR1, the power consumption in the data driver 300 may be effectively reduced and the data driver 300 may be more stably operated.

Figure 6:
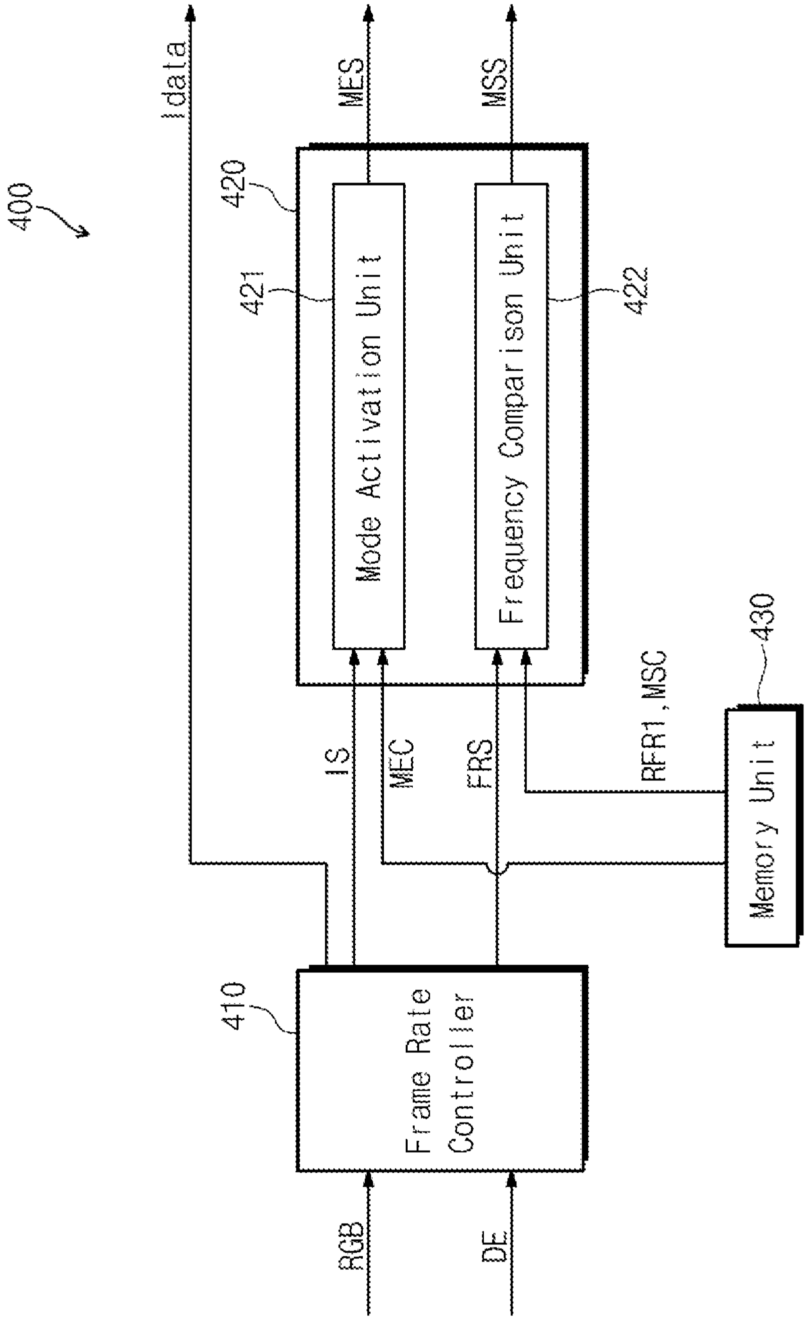
FIG. 6 is a block diagram showing a timing controller according to another exemplary embodiment of the present disclosure.

FIG. 6 is a block diagram showing a timing controller 400 according to another exemplary embodiment of the present disclosure.

Referring to FIG. 6, the memory unit 430 stores a mode selection control value MSC and a mode activation control value MEC.

The mode activation control value MEC has a mode inactivation value or a mode activation value. The mode activation unit 421 receives the mode activation control value MEC from the memory unit 430. The mode activation unit 421 generates the mode activation signal MES on the basis of the mode activation control value MEC. For instance, when the mode activation control value MEC has the mode inactivation value, the mode activation signal MES has the inactivation level always. Accordingly, the data driver 300 is operated in the normal mode N (refer to FIG. 5) regardless of the image frame rate.

Meanwhile, when the mode activation control value MEC has the mode activation value, the mode activation signal MES is generated to correspond to the blank period BP as described in FIGS. 3 to 5.

As described above, when the mode activation control value MEC is used, the mode activation control value MEC may be previously stored in the memory unit 430 in consideration of a purpose in use of the display apparatus 1000, and thus the stand-by mode S (refer to FIG. 5) or the power cut-off mode P (refer to FIG. 5) may be forcibly inactivated.

The mode selection control value MSC has a power cut-off mode value or a stand-by mode value. The frequency comparison unit 422 receives the mode selection control value MSC from the memory unit 430. The frequency comparison unit 422 generates the mode selection signal MSS on the basis of the mode selection control value MSC. For instance, when the mode selection control value MSC has the power cut-off mode value, the mode selection signal MSS has the first selection level always. Accordingly, the data driver 300 is operated in the power cut-off mode P during the blank period BP without being operated in the stand-by mode S.

Meanwhile, when the mode selection control value MSC has the stand-by mode value, the mode selection signal MSS has the low level always. Therefore, the data driver 300 is operated in the stand-by mode S during the blank period BP without being operated in the power cut-off mode P.

As described above, when the mode selection control value MSC is used, the mode activation control value MEC may be previously stored in the memory unit 430 by taking a purpose in use of the display apparatus 1000 into consideration, and thus the data driver 300 may be forcibly operated in the stand-by mode S or the power cut-off mode P.

Figure 7:
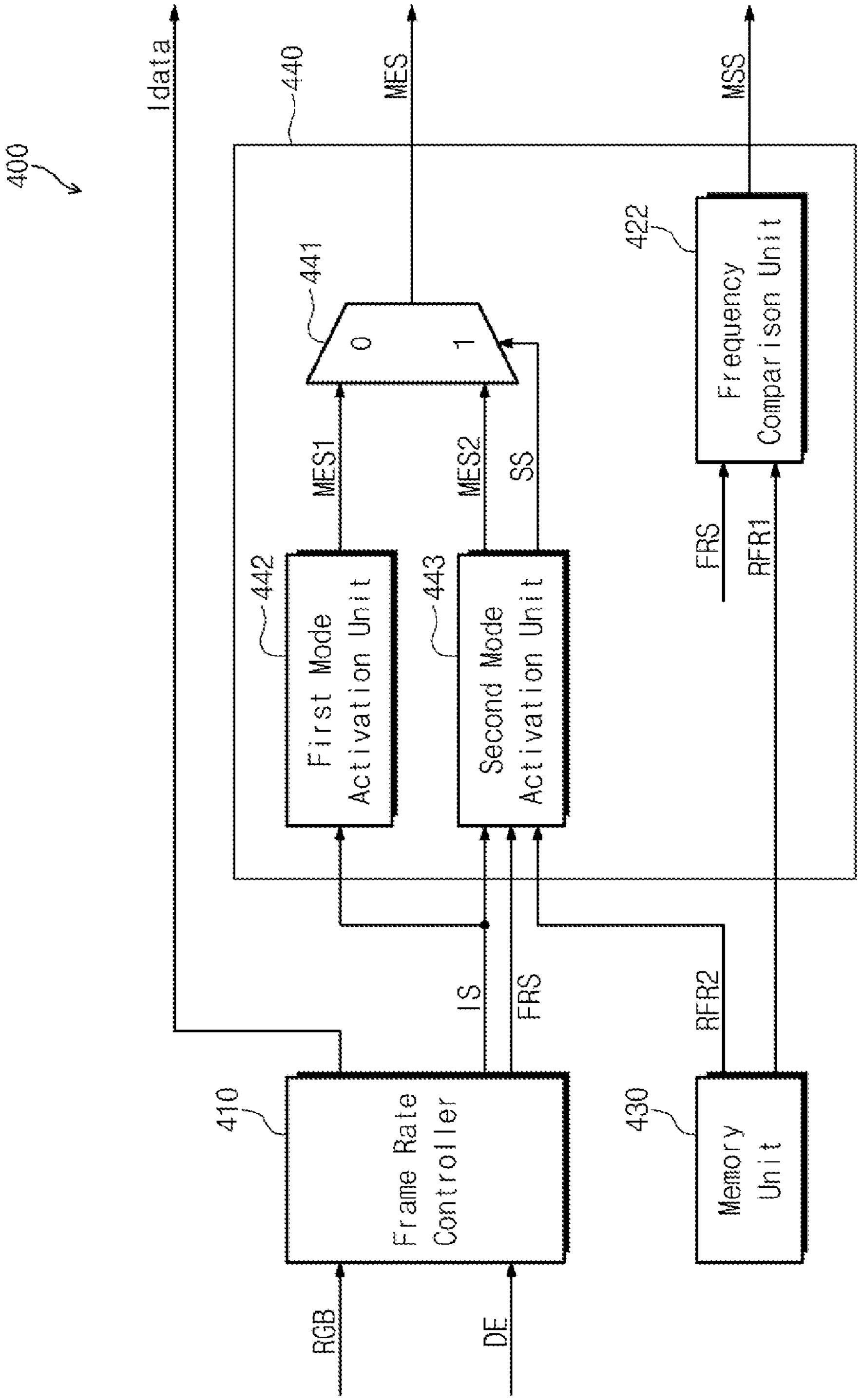
FIG. 7 is a block diagram showing a timing controller according to another exemplary embodiment of the present disclosure.
Figure 8:
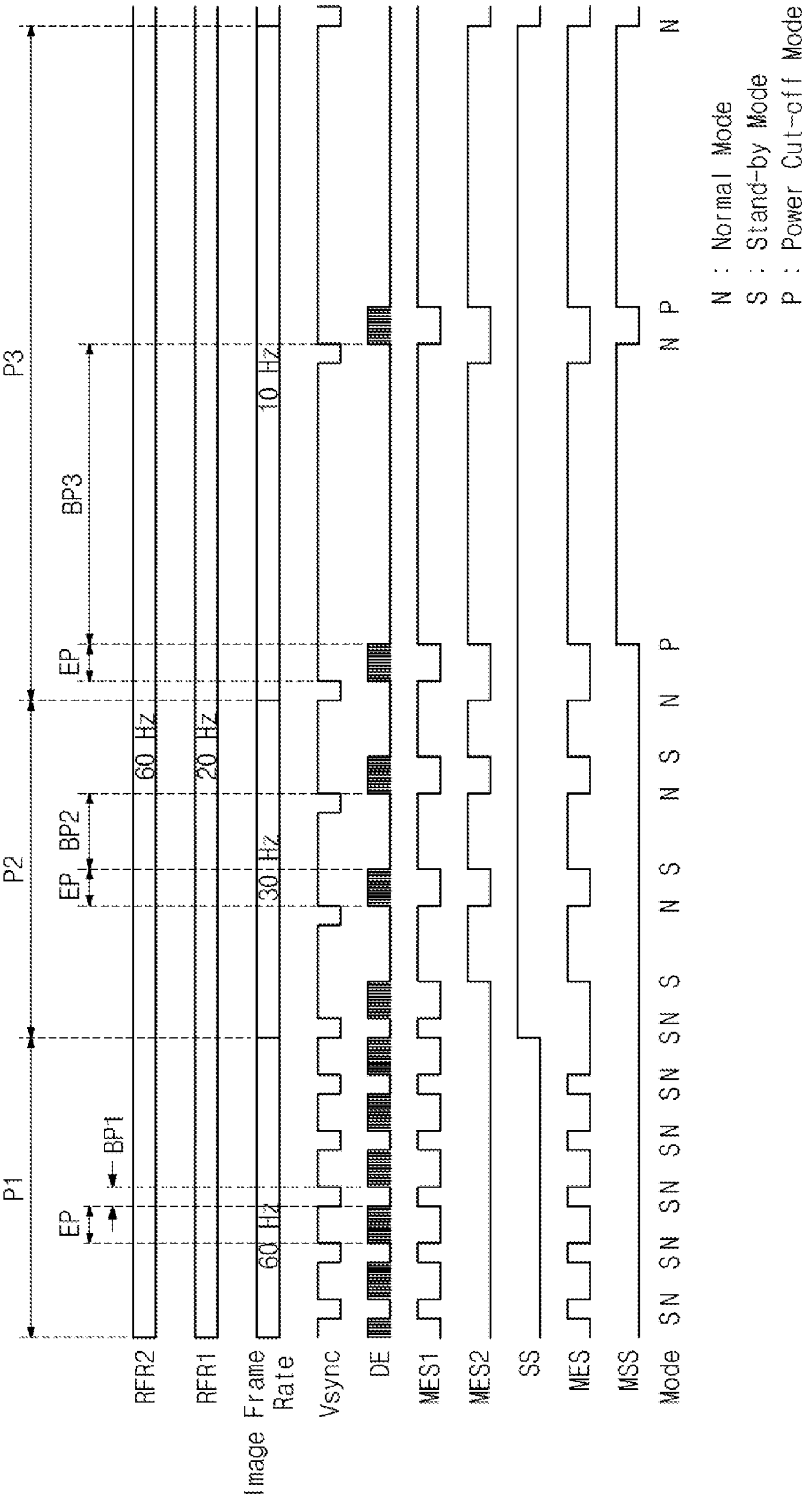
FIG. 8 is a timing diagram of signals shown in FIG. 7.

FIG. 7 is a block diagram showing a timing controller 400 according to another exemplary embodiment of the present disclosure and FIG. 8 is a timing diagram of signals shown in FIG. 7.

Referring to FIGS. 4 and 7, the timing controller 400 includes the frame rate controller 410 and a mode controller 440. The mode controller 440 includes a first mode activation unit 442 and a second mode activation unit 443.

The first mode activation unit 442 generates a first sub-activation signal MES1 in the blank period BP. As an example, the first mode activation unit 442 receives the intermediate signal IS from the frame rate controller 410 and generates the first sub-activation signal MES1 on the basis of the intermediate signal IS, but it should not be limited thereto or thereby. That is, in another embodiment, the first mode activation unit 442 receives the data enable signal DE and generates the first sub-activation signal MES1 on the basis of the data enable signal DE.

The first sub-activation signal MES1 has a level in the enable period EP, which is different from a level in the blank period BP. For instance, the first sub-activation signal MES1 has the activation level in the blank period BP and the inactivation level in the enable period EP. As described above, the activation level is the high level and the inactivation level is the low level.

The second mode activation unit 443 generates a second sub-activation signal MES2 different from the first sub-activation signal MES1. As an example, the second mode activation unit 443 receives the intermediate signal IS and the frame rate signal FRS from the frame rate controller 410 and generates the second sub-activation signal MES2 on the basis of the intermediate signal IS and the frame rate signal FRS, but it should not be limited thereto or thereby. That is, in another embodiment, the second mode activation unit 443 receives the data enable signal DE instead of the intermediate signal IS and generates the second sub-activation signal MES2 on the basis of the data enable signal DE and the frame rate signal FRS.

The second sub-activation signal MES2 may have the activation level and the inactivation level. The second mode activation unit 443 controls a time duration, in which the activation level and the inactivation level of the second sub-activation signal MES2 are maintained, such that the data driver 300 is stably operated when the data driver 300 is operated in the power cut-off mode.

The mode controller 440 may further include a selector 441 and a frequency comparison unit 422. However, the frequency comparison unit 422 may be included in the second mode activation unit 443 for improvement of chip design.

The selector 441 receives the first and second sub-activation signals MES1 and MES2 and selects either the first sub-activation signal MES1 or the second sub-activation signal MES2 in response to a selection signal SS. The selected signal is applied to the bias controller 350 and the driving voltage switch 360 as the mode activation signal MES.

As an example, when the image frame rate is smaller than a second reference frame rate RFR1, the selector 441 selects the second sub-activation signal MES2, and when the image frame rate is greater than the second reference frame rate RFR1, the selector 441 selects the first sub-activation signal MES1. The case that the image frame rate is greater than a second reference frame rate RFR2 includes the case that the image frame rate is equal to the second reference frame rate RFR2.

The second reference frame rate RFR2 may be substantially the same as the first reference frame rate RFR1, but it should not be limited thereto or thereby.

As another embodiment, the second reference frame rate RFR2 may be substantially the same as the input image frame rate. In this case, the selector 441 selects the second sub-activation signal MES2 when the frame rate controller 410 recognizes that the image is the still image and reduces the frame rate of the image information RGB.

The selection signal SS may be generated by the second mode activation unit 443. In more detail, the second mode activation unit 443 receives the frame rate signal FRS and extracts the image frame rate from the frame rate signal FRS. Then, the second mode activation unit 443 compares the image frame rate and the second reference frame rate RFR2 to generate the selection signal SS. For instance, when the image frame rate is smaller than the second reference frame rate RFR2, the selection signal SS has the high level, and when the image frame rate is greater than the second reference frame rate RFR2, the selection signal SS has the low level.

As an example, the second reference frame rate RFR2 may be stored in the memory unit 430. The second mode activation unit 443 reads out the second reference frame rate RFR2 from the memory unit 430.

Hereinafter, the operation of the timing controller 400 shown in FIG. 7 will be described in detail with reference to FIG. 8.

In the present exemplary embodiment, the first reference frame rate RFR1 is set to about 20 Hz and the second reference frame rate RFR2 is set to about 60 Hz.

The image data, the image frame rate, the vertical synchronization signal Vsync, and the data enable signal DE in the first to third periods P1 to P3 have been described with reference to FIG. 5, and thus details thereof will be omitted.

In addition, the second sub-activation signal MES2 has the inactivation level in the first period P1 and has one of the activation level and the inactivation level in the second and third periods P2 and P3 in response to the data enable signal DE.

Since the image frame rate is substantially the same as the second reference frame rate RFR1 in the first period P1, the selection signal SS has the low level. Accordingly, the selector 441 outputs the first sub-activation signal MES1 as the mode activation signal MES.

In the first period P1, the image frame rate is about 60 Hz. Since the image frame rate is greater than the first reference frame rate RFR1 in the first period P1, the mode selection signal MSS has the second selection level during the first period P1. Accordingly, the data driver 300 is not operated in the power cut-off mode P during the first period P1 and is operated in the normal mode N or the stand-by mode S in response to the first sub-activation signal MES1.

In more detail, the first sub-activation signal MES1 has the activation level during the blank period BP1 of the first period P1. Therefore, the data driver 300 is operated in the stand-by mode S during the blank period BP1 of the first period P1 and operated in the normal mode N during the data enable period EP of the first period P1. That is, the bias controller 350 reduces the current applied to the buffer 340 during the blank period BP1 of the first period P1. Thus, the power consumption in the buffer 340 may be reduced.

Since the image frame rate is smaller than the second reference frame rate RFR2 in the second period P2, the selection signal SS has the high level. Accordingly, the selector 441 outputs the second sub-activation signal MES2 as the mode activation signal MES.

In the second period P2, the image frame rate is about 30 Hz. Since the image frame rate is greater than the first reference frame rate RFR1 in the second period P2, the mode selection signal MSS has the second selection level during the second period P2 as similar to the first period P1. Therefore, the data driver 300 is not operated in the power cut-off mode P during the second period P2 and is operated in the normal mode N or the stand-by mode S during the second period P2 in response to the second sub-activation signal MES2.

In more detail, the second sub-activation signal MES2 has the activation level during the blank period BP2 of the second period P2. Thus, the data driver 300 is operated in the stand-by mode S during the blank period BP2 of the second period P2 and operated in the normal mode N during the data enable period EP of the second period P2. That is, the bias controller 350 reduces the current applied to the buffer 340 during the blank period BP2 of the second period P2.

In particular, since the length of the blank period BP2 of the second period P2 is longer than that of the blank period BP1 of the first period P1, a time duration in which the bias current IB is reduced in the second period P2 is longer than a time duration in which the bias current IB is reduced in the first period P1. Accordingly, the amount in reduction of the power consumption in the second period P2 is greater than the amount in reduction of the power consumption in the first period P1.

Since the image frame rate is smaller than the second reference frame rate RFR2 in the third period P3, the selection signal SS has the high level. Accordingly, the selector 441 outputs the second sub-activation signal MES2 as the mode activation signal MES.

In the third period P3, the image frame rate is about 10 Hz. Since the image frame rate is smaller than the first reference frame rate RFR1 in the third period P3, the mode selection signal MSS has the first selection level during the third period P3. Therefore, the data driver 300 is not operated in the stand-by mode S during the third period P3 and is operated in the normal mode N or the power cut-off mode P during the third period P3 in response to the second sub-activation signal MES2.

In more detail, the second sub-activation signal MES2 has the activation level during the blank period BP3 of the third period P3. Thus, the data driver 300 is operated in the power cut-off mode P during the blank period BP3 of the third period P3 and operated in the normal mode N during the data enable mode EP of the third period P3. That is, the driving voltage switch 360 cuts off the analog driving voltage AVDD applied to at least one of the buffer 340 and the voltage generator 330 during the blank period BP3 of the third period P3.

As described above, the data driver 300 is operated in the power cut-off mode P when the image frame rate is smaller than the first reference frame rate RFR1, and the data driver 300 is operated in the stand-by mode S when the image frame rate is greater than the first reference frame rate RFR1.

In particular, the timing controller 400 includes the first and second mode activation units 442 and 443, and thus the timing controller 400 independently generates the first and second sub-activation signals MES1 and MES2. Therefore, the data driver 300 is more stably operated in the stand-by mode S or the power cut-off mode P.

Figure 9:
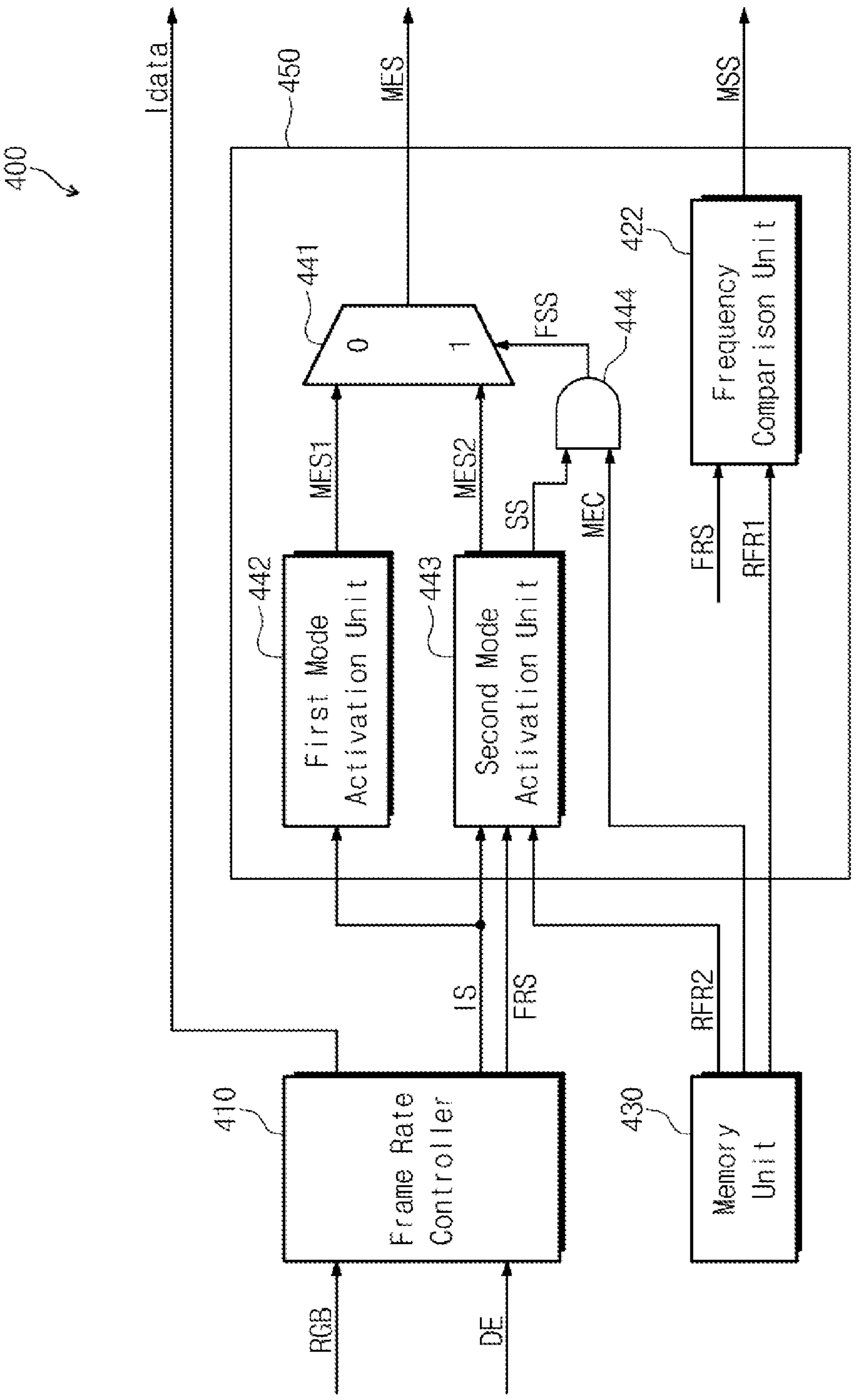
FIG. 9 is a block diagram showing a timing controller according to another exemplary embodiment of the present disclosure.

FIG. 9 is a block diagram showing a timing controller 400 according to another exemplary embodiment of the present disclosure.

Referring to FIG. 9, the memory unit 430 stores a mode activation control value MEC. The mode activation control value MEC has the high level or the low level.

A mode controller 450 of the timing controller 400 includes a logic gate 444. The logic gate 444 receives the selection signal SS from the second mode activation unit 443 and the mode activation control value MEC from the memory unit 430.

For instance, the logic gate 444 may be an AND gate to perform an AND operation. When the mode activation control value MEC has the high level, the logic gate 444 outputs the selection signal SS as a final selection signal FSS. The selector 441 outputs one of the first and second sub-activation signals MES1 and MES2 as the mode activation signal MES in response to the final selection signal FSS.

When the mode activation control value MEC has the low level, the logic gate 444 outputs the final selection signal FSS having the low level. The selector 441 outputs the first sub-activation signal MES1 as the mode activation signal MES in response to the final selection signal FSS.

As described above, when the mode activation control value MEC is used, the mode activation control value MEC may be previously stored in the memory unit 430 in consideration of a purpose in use of the display apparatus 1000, and thus the first sub-activation signal MES1 may be forcibly selected.

Figure 10:
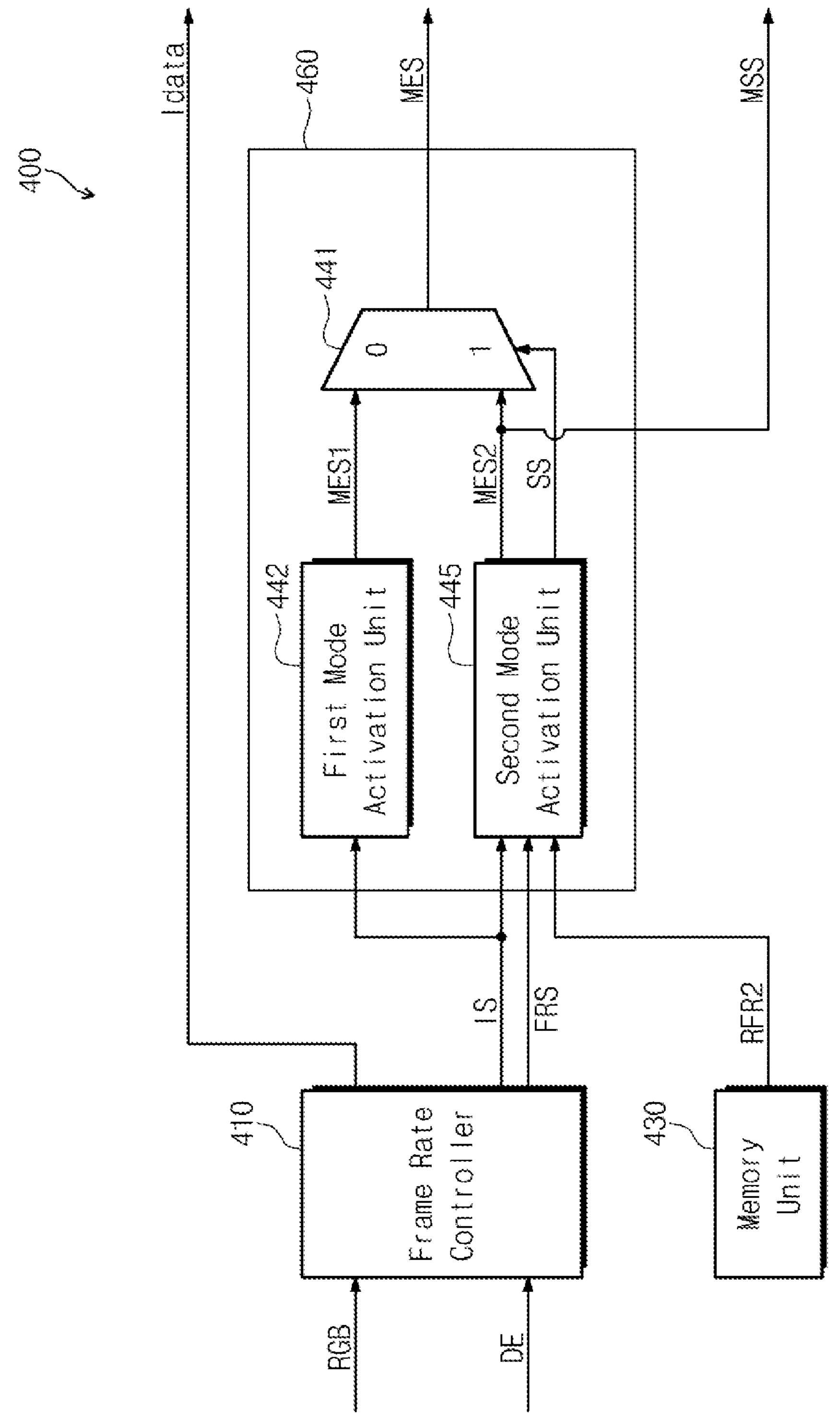
FIG. 10 is a block diagram showing a timing controller according to another exemplary embodiment.
Figure 11:
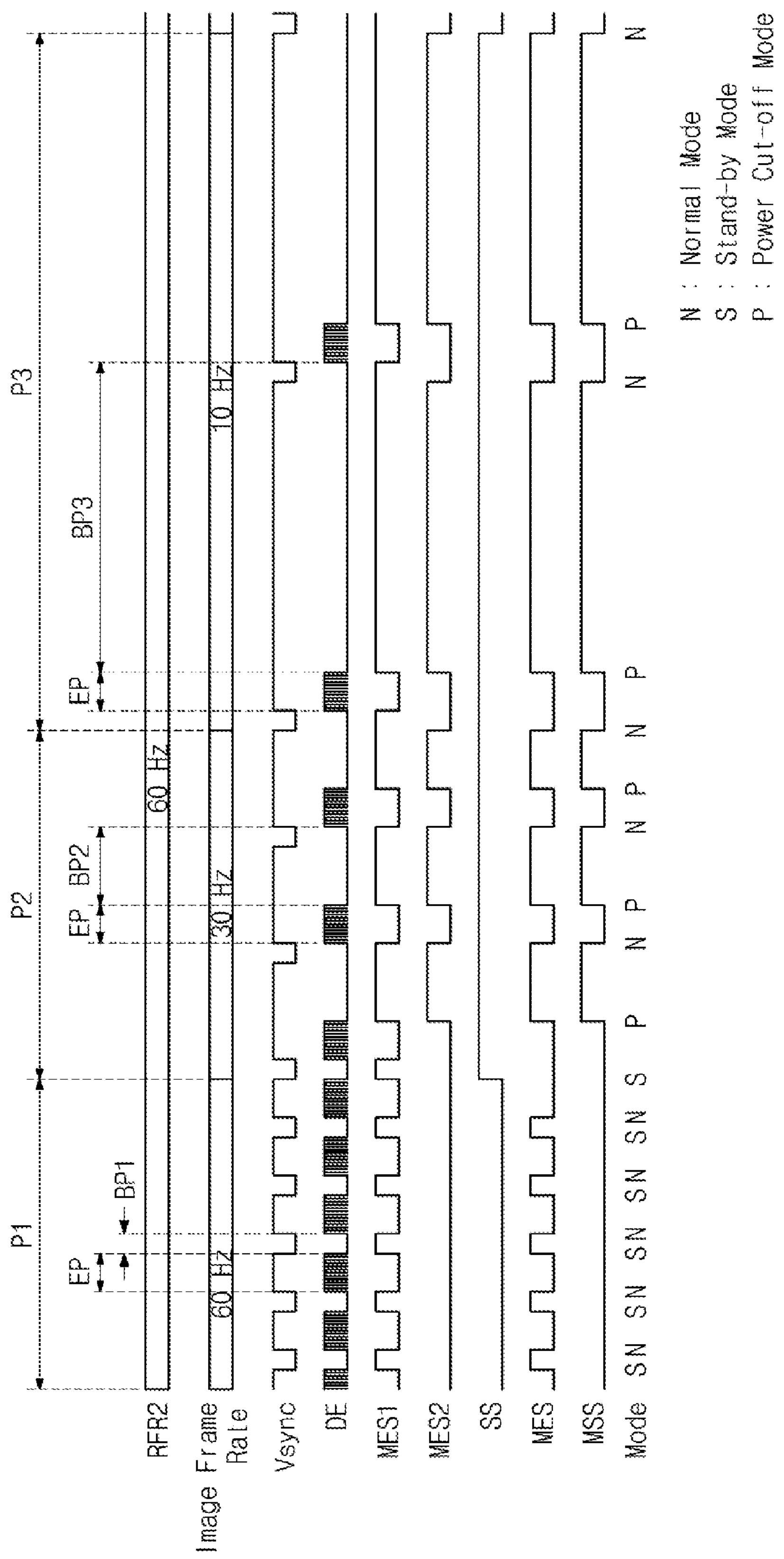
FIG. 11 is a timing diagram of signals shown in FIG. 10.

FIG. 10 is a block diagram showing a timing controller 400 according to another exemplary embodiment and FIG. 11 is a timing diagram of signals shown in FIG. 10.

Referring to FIG. 10, the timing controller 400 includes the frame rate controller 410 and a mode controller 460. The mode controller 460 includes the selector 441, the first mode activation unit 442, and a second mode activation unit 445.

The second mode activation unit 445 generates the mode selection signal MSS. In more detail, the second mode activation unit 445 outputs the second sub-activation signal MES2 as the mode selection signal MSS.

Hereinafter, the operation of the timing controller 400 will be described in detail with reference to FIGS. 4 and 11.

In the present exemplary embodiment, the second reference frame rate RFR2 is set to about 60 Hz.

The image data, the image frame rate, the vertical synchronization signal Vsync, and the data enable signal DE in the first to third periods P1 to P3 have been described with reference to FIG. 5, and thus details thereof will be omitted.

In addition, the second sub-activation signal MES2 has the inactivation level in the first period P1 and has one of the activation level and the inactivation level in the second and third periods P2 and P3 in response to the data enable signal DE.

The image frame rate is about 60 Hz in the first period P1. Since the image frame rate is substantially the same as the second reference frame rate RFR1 in the first period P1, the selection signal SS has the low level. Accordingly, the selector 441 outputs the first sub-activation signal MES1 as the mode activation signal MES.

The second sub-activation signal MES2 has the inactivation level, i.e., the low level, during the first period P1. Accordingly, the mode selection signal MSS has the second selection level, i.e., the low level, during the first period P1. Therefore, the data driver 300 is not operated in the power cut-off mode P during the first period P1 and is operated in the normal mode N or the stand-by mode S in response to the first sub-activation signal MES1.

In more detail, the first sub-activation signal MES1 has the activation level during the blank period BP1 of the first period P1. Therefore, the data driver 300 is operated in the stand-by mode S during the blank period BP1 of the first period P1 and operated in the normal mode N during the data enable period EP of the first period P1. That is, the bias controller 350 reduces the current applied to the buffer 340 during the blank period BP1 of the first period P1. Thus, the power consumption in the buffer 340 may be reduced.

The image frame rate is about 30 Hz during the second period P2. Since the image frame rate is smaller than the second reference frame rate RFR2 in the second period P2, the selection signal SS has the high level. Accordingly, the selector 441 outputs the second sub-activation signal MES2 as the mode activation signal MES.

In the second period P2, the second sub-activation signal MES2 has the activation level, i.e., the high level, during the blank period BP2 of the second period P2 and has the inactivation level, i.e., the low level, during the enable period EP of the second period P2. Thus, the mode selection signal MSS has the first selection level, i.e., the high level, during the blank period BP2 of the second period P2 and has the second selection level, i.e., the low level, during the enable period EP of the second period P2.

Therefore, the data driver 300 is operated in the normal mode N during the enable period EP of the second period P2 and operated in the power cut-off mode P during the blank period BP2 of the second period P2.

In the third period P3, the image frame rate is about 10 Hz. Since the image frame rate is smaller than the second reference frame rate RFR2 in the third period P3, the selection signal SS has the high level. Accordingly, the selector 441 outputs the second sub-activation signal MES2 as the mode activation signal MES.

In the third period P3, the second sub-activation signal MES2 has the activation level, i.e., the high level, during the blank period BP3 of the third period P3 and has the inactivation level, i.e., the low level, during the enable period EP of the third period P3. Thus, the mode selection signal MSS has the first selection level, i.e., the high level, during the blank period BP3 of the third period P3 and has the second selection level, i.e., the low level, during the enable period EP of the third period P3.

Therefore, the data driver 300 is operated in the normal mode N during the enable period EP of the third period P3 and operated in the power cut-off mode P during the blank period BP3 of the third period P3.

As described above, the data driver 300 is operated in the power cut-off mode P when the image frame rate is smaller than the second reference frame rate RFR2, and the data driver 300 is operated in the stand-by mode S when the image frame rate is equal to or greater than the second reference frame rate RFR2.

In particular, the timing controller 400 does not require to include the frequency comparison unit 422 (refer to FIG. 9), and thus the circuit configuration of the mode controller 460 is simplified.

Although the exemplary embodiments of the inventive concept have been described, it is understood that the inventive concept should not be limited to these exemplary embodiments but various changes and modifications can be made by one ordinary skilled in the art within the spirit and scope of the inventive concept as hereinafter claimed.

What is claimed is:

1. A display apparatus comprising:
- a display panel configured to display an image;
- a data driver that comprises a voltage generator configured to convert an image data applied thereto to a data voltage, a buffer configured to apply the data voltage to the display panel, a driving voltage switch configured to switch an analog driving voltage input to the voltage generator and the buffer, and a bias controller configured to control a bias current applied to the buffer; and
- a timing controller that comprises a mode controller configured to generate a mode selection signal on the basis of an image frame rate of the image data, wherein the data driver is configured to be operated in a power cut-off mode or a stand-by mode in response to the mode selection signal, the driving voltage switch is configured to cut off the analog driving voltage applied to at least one of the buffer and the voltage generator during the power cut-off mode, and the bias controller is configured to reduce the bias current in the stand-by mode, wherein the data driver is configured to be operated in the power cut-off mode when the image frame rate is smaller than a first reference frame rate and the data driver is configured to be operated in the stand-by mode when the image frame rate is greater than the first reference frame rate.

2. The display apparatus of claim 1, wherein the mode selection signal is configured to have a first selection level when the image frame rate is smaller than the first reference frame rate and to have a second selection level when the image frame rate is greater than the first reference frame rate, and the data driver is configured to be operated in the power cut-off mode in response to the mode selection signal having the first selection level and operated in the stand-by mode in response to the mode selection signal having the second selection level.

3. The display apparatus of claim 2, wherein the mode controller comprises a frequency comparison unit that is configured to receive the image frame rate and the first reference frame rate and compare the image frame rate and the first reference frame rate to generate the mode selection signal.

4. The display apparatus of claim 3, wherein the timing controller further comprises a memory unit configured to store a mode selection control value, and the mode selection signal is configured to have the first selection level when the mode selection control value has a power cut-off mode value and the mode selection signal is configured to have the second selection level when the mode selection control value has a stand-by mode value.

5. The display apparatus of claim 3, wherein the timing controller is configured to receive a data enable signal that defines a blank period and an enable period, and the data driver is configured to be operated in the power cut-off mode or the stand-by mode during the blank period and operated in a normal mode during the enable period.

6. The display apparatus of claim 5, wherein the mode controller further comprises a mode activation unit configured to generate a mode activation signal in the blank period, and the data driver is configured to be operated in the power cut-off mode or the stand-by mode during the blank period in response to the mode activation signal.

7. The display apparatus of claim 6, wherein the mode activation signal is configured to have an activation level during the blank period and to have an inactivation level during the enable period, and the data driver is configured to be operated in the power cut-off mode or the stand-by mode in response to the activation level.

8. The display apparatus of claim 7, wherein the timing controller further comprises a memory unit configured to store a predetermined mode activation control value, and the mode activation signal is configured to have the inactivation level when the mode activation control value has a mode inactivation value.

9. The display apparatus of claim 7, wherein the timing controller further comprises a frame rate controller configured to receive an image information having an input frame rate, analyze the image information, and convert the image information to the image data having the image frame rate according to the analyzed result.

10. The display apparatus of claim 9, wherein the frame rate controller is configured to generate an intermediate signal in the blank period and the mode activation unit is configured to generate the mode activation signal in response to the intermediate signal.

11. The display apparatus of claim 9, wherein the frame rate controller is configured to generate a frame rate signal on the basis of the image frame rate and the frequency comparison unit is configured to extract the image frame rate from the frame rate signal.

12. The display apparatus of claim 5, wherein the mode controller further comprises:

a first mode activation unit that is configured to generate a first sub-activation signal;

a second mode activation unit that is configured to generate a second sub-activation signal; and a selector that is configured to select one of the first and second sub-activation signals in response to a selection signal and output the selected signal to the bias controller and the driving voltage switch as a mode activation signal.

13. The display apparatus of claim 12, wherein the selector is configured to select the first sub-activation signal when the image frame rate is greater than a second reference frame rate and select the second sub-activation signal when the image frame rate is smaller than the second reference frame rate.

14. The display apparatus of claim 13, wherein the second reference frame rate is substantially the same as the first reference frame rate.

15. The display apparatus of claim 13, further comprising a frame rate controller configured to receive an image information having an input frame rate, analyze the image information, and convert the image information to the image data having the image frame rate according to the analyzed result.

16. The display apparatus of claim 15, wherein the second reference frame rate is substantially the same as the input frame rate.

17. The display apparatus of claim 16, wherein the frame rate controller is configured to generate an intermediate signal and generate a frame rate signal on the basis of the image frame rate during the blank period, the first mode activation unit is configured to generate the first sub-activation signal in response to the intermediate signal, and the second mode activation unit is configured to generate the second sub-activation signal on the basis of the intermediate signal and the frame rate signal.

18. The display apparatus of claim 1, wherein the mode controller further comprises:

a first mode activation unit configured to generate a first sub-activation signal;

a second mode activation unit configured to generate a second sub-activation signal; and a selector configured to select one of the first and second sub-activation signals in response to a selection signal and output the selected signal to the bias controller and the driving voltage switch as a mode activation signal.

19. The display apparatus of claim 18, wherein the selection signal is the second sub-activation signal.

* * * * *